(12) United States Patent
Harada

(10) Patent No.: US 12,539,757 B2
(45) Date of Patent: Feb. 3, 2026

(54) ACTUATOR SYSTEM, VEHICLE, AND VEHICLE CONTROL METHOD

(71) Applicant: TOYOTA JIDOSHA KABUSHIKI KAISHA, Toyota (JP)

(72) Inventor: Takahisa Harada, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 18/083,960

(22) Filed: Dec. 19, 2022

(65) Prior Publication Data

US 2023/0294515 A1 Sep. 21, 2023

(30) Foreign Application Priority Data

Mar. 16, 2022 (JP) .................... 2022-041578

(51) Int. Cl.
*B60K 31/00* (2006.01)

(52) U.S. Cl.
CPC ...... *B60K 31/00* (2013.01); *B60K 2031/0091* (2013.01)

(58) Field of Classification Search
CPC ................ B60K 31/00; B60K 2031/0091
USPC ........................................................ 701/93
See application file for complete search history.

(56) References Cited

U.S. PATENT DOCUMENTS

| | | |
|---|---|---|
| 2005/0055151 A1 | 3/2005 | Kustosch |
| 2010/0138123 A1 | 6/2010 | Tokimasa et al. |
| 2017/0217436 A1 | 8/2017 | Inomata |
| 2018/0043885 A1 | 2/2018 | Harada et al. |
| 2018/0162390 A1 | 6/2018 | Miura et al. |
| 2020/0070802 A1* | 3/2020 | Yamada ................. B60W 30/02 |
| 2021/0237696 A1* | 8/2021 | Kumar ................... B60T 7/126 |
| 2021/0300332 A1 | 9/2021 | Kasuya et al. |
| 2022/0281325 A1* | 9/2022 | Naito ..................... B60L 50/15 |

FOREIGN PATENT DOCUMENTS

| | | |
|---|---|---|
| DE | 101 05 645 A1 | 12/2001 |
| JP | 2005-514265 A | 5/2005 |
| JP | 2008024027 A * | 2/2008 |
| JP | 2009-138861 A | 6/2009 |
| JP | 2020-032892 A | 3/2020 |
| JP | 2021-154903 A | 10/2021 |
| KR | 10-2019-0018053 A | 2/2019 |

OTHER PUBLICATIONS

Piotr F. Orzechowski, Decision-Making for Automated Vehicles Using a Hierarchical Behavior-Based Arbitration Scheme, Oct. 23, 2020, 2020 IEEE Intelligent Vehicles Symposium (IV) (Year: 2020).*

* cited by examiner

*Primary Examiner* — Matthias S Weisfeld

(74) *Attorney, Agent, or Firm* — Oliff PLC

(57) ABSTRACT

An actuator system configured to control an operation of a vehicle includes at least one application configured to set a kinematic plan for the vehicle, and one and more processors configured to arbitrate a plurality of kinematic plans including a kinematic plan set by the at least one application.

9 Claims, 6 Drawing Sheets

ACTUATOR SYSTEM, VEHICLE, AND VEHICLE CONTROL METHOD

CROSS-REFERENCE TO RELATED APPLICATION

This application claims priority to Japanese Patent Application No. 2022-041578 filed on Mar. 16, 2022, incorporated herein by reference in its entirety.

BACKGROUND

1. Technical Field

The present disclosure relates to an actuator system, a vehicle, and a vehicle control method.

2. Description of Related Art

For example, a control device described in Japanese Unexamined Patent Application Publication No. 2020-032892 (JP 2020-032892 A) includes a request arbitration unit that arbitrates motion requests from a plurality of application request units on driver assistance. The request arbitration unit is included in a brake ECU, which is a control device used for controlling a brake of a vehicle. The application request units and the brake ECU (the request arbitration unit) are included in different ECUs. In other words, the application request units and the brake ECU can communicate with each other via inter-ECU communication.

SUMMARY

In the control device described in JP 2020-032892 A, as above, the 25 application request units and the brake ECU (the request arbitration unit) are included in different ECUs and can communicate with each other via the inter-ECU communication. For this reason, when a request (a kinematic plan) from the application request unit is transmitted to the request arbitration unit, the request (the kinematic plan) may be altered between the ECUs. Therefore, it is desirable to restrict the request (the kinematic plan) by an application from being altered.

The present disclosure provides an actuator system, a vehicle, and a vehicle control method capable of restricting a request (a kinematic plan) by an application from being altered.

An actuator system according to a first aspect of the present disclosure is configured to control an operation of a vehicle. The actuator system includes at least one application configured to set a kinematic plan for the vehicle and one or more processors configured to arbitrate a plurality of kinematic plans including the kinematic plan set by the at least one application.

As above, the actuator system according to the first aspect includes the application and the processors as an arbitration unit. Therefore, since the application and the arbitration unit are included in a common system (the actuator system), the arbitration unit can easily acquire a request (the kinematic plan) by the application without using communication. As a result, since the request (the kinematic plan) by the application is not altered during the communication, it is possible to restrict the request (the kinematic plan) by the application from being altered.

In the first aspect, the actuator system may further include an actuator configured to control driving of the vehicle and an electronic control unit configured to control an operation of the actuator. The electronic control unit may include the at least one application and the processors. With such a configuration, since the application and the arbitration unit are included in the common part (the electronic control unit as an actuator control unit) of the actuator system, the arbitration unit can more easily acquire the request (the kinematic plan) by the application without using the communication. As a result, it is possible to restrict the request (the kinematic plan) by an application from being altered.

In the first aspect, the actuator system may further include an actuator configured to control driving of the vehicle and an electronic control unit configured to control an operation of the actuator. The actuator may include a power train. With such a configuration, it is possible to restrict the request (the kinematic plan) from the actuator system (a power train system) that controls the power train from being altered.

In the first aspect, the at least one application may include an application used for limiting a velocity of the vehicle. With such a configuration, it is possible to restrict the request (the kinematic plan) that limits the velocity of the vehicle from being altered.

A vehicle according to a second aspect of the present disclosure includes a vehicle body, and a first actuator system configured to control an operation of the vehicle body and including at least one first application and a first processor. The first application is configured to set a first kinematic plan for the vehicle, and the first processor is configured to arbitrate a plurality of kinematic plans including the first kinematic plan.

As above, the vehicle according to the second aspect includes the at least one application and a processor as an arbitration unit that arbitrates the plurality of kinematic plans including the kinematic plan set by the at least one application. Therefore, since the first application and a first arbitration unit are included in a common system (a first actuator system), the first arbitration unit can easily acquire a request (the kinematic plan) by the first application without using communication. As a result, it is possible to restrict the request (a first kinematic plan) by the first application from being altered.

In the second aspect, the vehicle may further include a second application configured to set a second kinematic plan for the vehicle, and a second actuator system that is configured to control the operation of the vehicle body and is different from the first actuator system. The first processor may be configured to execute a first arbitration, and the second actuator system may include a second processor configured to arbitrate an arbitration result by the first arbitration of the first actuator system and the second kinematic plan set by the second application. With such a configuration, a result of the arbitration of the request of the second application by the second processor as a second arbitration unit is input in a predetermined system to which the kinematic plan by the second application is transmitted without directly inputting the request (the kinematic plan) of the second application. As such, even when the number of requests (the second kinematic plans) by the second application is increased, it is not required to increase the number of interfaces between the second arbitration unit and the predetermined system. In other words, it is possible to integrate the interface between the second actuator system and the predetermined system into an interface between the second arbitration unit and the predetermined system. As a result, even when the number of requests (the second kinematic plans) by the second application is increased, it is possible to restrict a configuration of the vehicle from becoming complicated.

In the second aspect, the vehicle may further include a driver assistance system configured to set a driver assistance kinematic plan on driver assistance of the vehicle. The driver assistance system may be configured to set the driver assistance kinematic plan based on an arbitration result by the second processor. With such a configuration, it is possible to integrate the interface between the second actuator system and the driver assistance system into an interface between the second arbitration unit and the driver assistance system.

In the second aspect, the vehicle may further include a third actuator system that is configured to set a third kinematic plan for the vehicle and is different from the first actuator system. The first processor may be configured to execute a second arbitration, and the plurality of kinematic plans arbitrated in the second arbitration may include the third kinematic plan set by the third actuator system in addition to the first kinematic plan set by the first application of the first actuator system. With such a configuration, by the first processor included in the first actuator system, it is possible to easily arbitrate the request (the first kinematic plan) by the first application included in the first actuator system and the request (the third kinematic plan) by the third actuator system different from the first actuator system.

In the second aspect, the first processor may be configured to determine whether the first kinematic plan set by the first application is normal, and execute, upon determining that the first kinematic plan is not normal, first processing for rejecting or changing the first kinematic plan. The first processor may be configured to determine whether the third kinematic plan set by the third actuator system is normal and execute, upon determining that the third kinematic plan is not normal, second processing for rejecting or changing the third kinematic plan. In the second arbitration, the first processor may be configured to arbitrate a result processed by the first processing and a result processed by the second processing. With such a configuration, when at least one of the first kinematic plan and the third kinematic plan is abnormal, it is possible to reject or change the at least one of the first kinematic plan and the third kinematic plan that is abnormal in a first processing and a second processing. As a result, it is possible to restrict the arbitration from being executed based on the abnormality in the first processor.

A third aspect of the present disclosure is a vehicle control method using an actuator system configured to control an operation of a vehicle. The vehicle control method includes receiving a plurality of kinematic plans including a kinematic plan set by at least one application included in the actuator system and arbitrating, by one or more processors included in the actuator system, the received plurality of kinematic plans in the receiving.

As above, in the vehicle control method according to the third aspect, the plurality of kinematic plans including the kinematic plans set by at least one application included in the actuator system is received, and the plurality of kinematic plans is arbitrated by the processor, as the arbitration unit, included in the actuator system. Therefore, since the first application and a first arbitration unit are included in a common system (a first actuator system), the first arbitration unit can easily acquire a request (the kinematic plan) by the first application without using communication. As a result, it is possible to provide the vehicle control method in which it is possible to restrict the request (the first kinematic plan) by the first application from being altered.

A fourth aspect of the present disclosure is a non-transitory storage medium storing instructions that are executable by a computer and that cause the computer to perform functions. The functions include receiving a plurality of kinematic plans including a kinematic plan set by at least one application included in an actuator system configured to control an operation of a vehicle and arbitrating, by one or more processors included in the actuator system, the received plurality of kinematic plans in the receiving.

As above, in the non-transitory storage medium according to the fourth aspect, the instructions that cause the computer to receive the plurality of kinematic plans including the kinematic plan set by at least one application included in the actuator system, and arbitrate, by the processor as an arbitration unit included in the actuator system, the plurality of kinematic plans are stored. Therefore, since the first application and a first arbitration unit are included in a common system (a first actuator system), the first arbitration unit can easily acquire a request (the kinematic plan) by the first application without using communication. As a result, it is possible to provide the non-transitory storage medium in which it is possible to restrict the request (the first kinematic plan) by the first application from being altered.

With each aspect of the present disclosure, it is possible to restrict a request (a kinematic plan) by an application from being altered.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
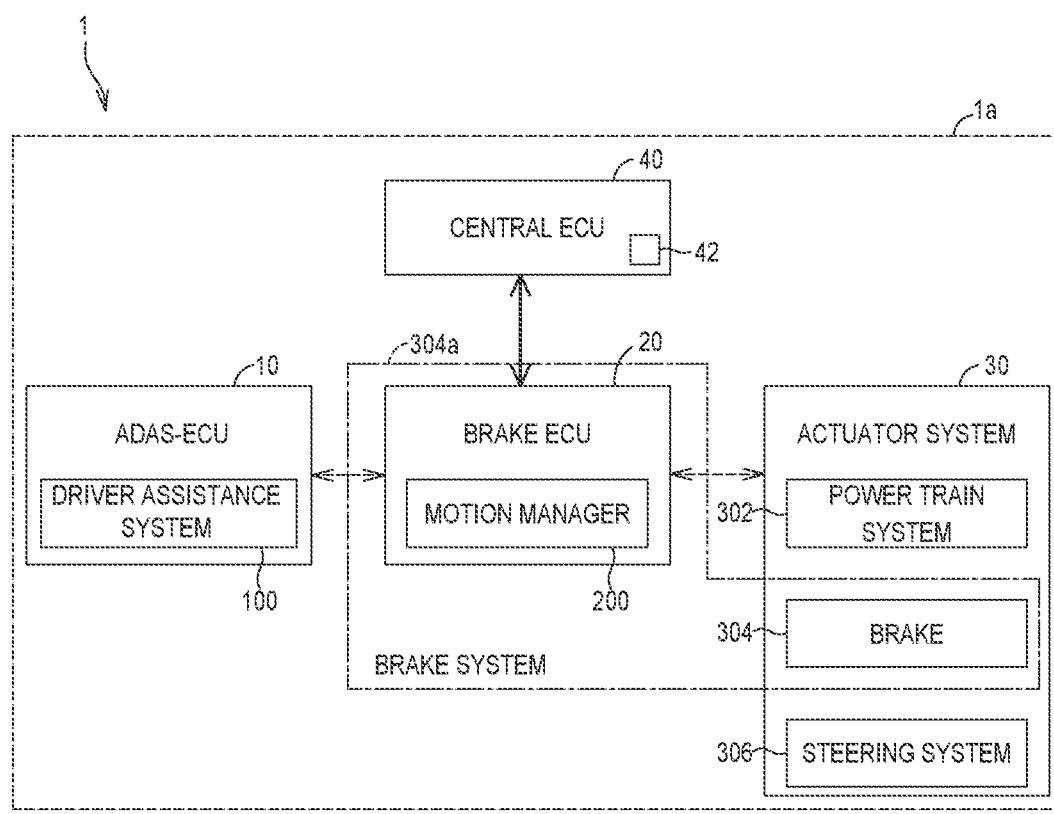
FIG. 1 is a diagram illustrating a configuration of a vehicle according to a first embodiment.

Hereinafter, a first embodiment of the present disclosure will be described in detail with reference to the drawings. The same or corresponding parts in the drawings are denoted by the same reference signs and the description thereof will not be repeated.

Configuration of Vehicle

FIG. 1 is a diagram illustrating an example of a configuration of a vehicle 1. As illustrated in FIG. 1, the vehicle 1 includes an ADAS-electronic control unit (ECU) 10, a brake ECU 20, an actuator system 30, and a central ECU 40.

The vehicle 1 may be a vehicle having a configuration capable of realizing a function of a driver assistance system described below, and may be, for example, a vehicle having an engine as a driving source, a battery electric vehicle having an electric motor as a driving source, or a hybrid electric vehicle having an engine and an electric motor mounted thereon and using at least one of them as a driving source.

The ADAS-ECU 10, the brake ECU 20, a power train ECU 302*b* described below, and the central ECU 40 are all computers, each of which has a processor that executes a program, such as a central processing unit (CPU), a memory, and an input/output interface. Therefore, each functional block (see FIG. 2) included in the brake ECU 20 and the power train ECU 302*b* is software that exhibits its function when a program is executed by a computer.

The ADAS-ECU 10 includes a driver assistance system 100 having a function of driver assistance of the vehicle 1. The driver assistance system 100 sets a kinematic plan on driver assistance of the vehicle 1. Specifically, the driver assistance system 100 is configured to realize various functions for assisting driving of the vehicle 1 including at least one of a steering control, a driving control, and a braking control of the vehicle 1 by executing applications mounted on the driver assistance system 100. Examples of the applications mounted on the driver assistance system 100 include an application that realizes a function of an autonomous driving system (AD), an application that realizes a function of an autonomous parking system, and an application (hereinafter, referred to as an ADAS application) that realizes a function of an advanced driver assistance system (ADAS), and the like. The kinematic plan set by the driver assistance system 100 is one example of a "driver assistance kinematic plan" of the present disclosure.

Examples of the ADAS application include at least one of an application that realizes a function of follow-up traveling (an adaptive cruise control (ACC) or the like) that travels while constantly keeping a distance with a preceding vehicle, an application that realizes a function of an auto speed limiter (ASL) that recognizes a vehicle velocity limit and maintains an upper limit value of velocity of a subject vehicle, an application that realizes a function of a lane maintenance assistance (a lane keeping assist (LKA), a lane tracing assist (ASL), or the like) that executes maintenance of a lane in which a vehicle travels, an application that realizes a function of a collision damage mitigation braking (an autonomous emergency braking (AEB), a pre-crash safety (PCS), or the like) that executes autonomous braking to mitigate damage caused by a collision, and an application that realizes a function of a lane departing warning (a lane departure warning (LDW), a lane departure alert (LDA), or the like) that warns the vehicle 1 of departure from a lane in which it travels.

Each application of the driver assistance system 100 outputs, to the brake ECU 20 (more specifically, the motion manager 200), a request for a kinematic plan that guarantees a commercial value (a function) of each application based on information of a vehicle surroundings situation acquired (input) from a plurality of sensors (not shown), an assistance request of a driver, or the like. Examples of the plurality of sensors include a vision sensor, such as a forward-looking camera, a radar, light detection and ranging (LiDAR), a position detection device, or the like.

Each application acquires information of the vehicle surroundings situation that integrates detection results of one or more sensors as recognition sensor information, and acquires an assistance request of the driver by way of a user interface (not shown), such as a switch. For example, each application can recognize other vehicles, obstacles, or people on the surroundings of the vehicle by image processing on an image or video on the surroundings of the vehicle acquired by the plurality of sensors, using artificial intelligence (AI) or an image processing processor.

Further, the kinematic plan includes, for example, a request for longitudinal acceleration/deceleration generated in the vehicle 1, a request for a steering angle of the vehicle 1, a request for holding stopping of the vehicle 1, or the like.

Examples of the request for the longitudinal acceleration/deceleration generated in the vehicle 1 include an operation request to a power train system 302 or an operation request to a brake 304. The brake system 304*a* is composed of the brake ECU and the brake 304. The power train system 302 is one example of the "first actuator system" and the "actuator system" of the present disclosure. Further, the brake system 304*a* is one example of the "second actuator system" of the present disclosure.

The application mounted on the driver assistance system 100 is not particularly limited to the above-described applications. An application that realizes other functions may be added or an existing application may be omitted, and, in particular, the number of the mounted applications is not limited.

Further, in the first embodiment, a case where the ADAS-ECU 10 includes the driver assistance system 100 composed of a plurality of applications is described, but for example, an ECU may be provided for each application. For example, the driver assistance system 100 may be composed of an ECU having an application that realizes a function of an autonomous driving system mounted thereon, an ECU having an application that realizes a function of an autonomous parking system mounted thereon, and an ECU having an ADAS application mounted thereon.

The brake ECU 20 includes the motion manager 200. In the first embodiment, a case where the brake ECU 20 has a hardware configuration including the motion manager 200 is described as an example, but the motion manager 200 may be provided as a single ECU separately from the brake ECU 20, or may be included in another ECU different from the brake ECU 20. The brake ECU 20 is configured to be communicable with each of the ADAS-ECU 10, various ECUs included in the actuator system 30, and the central ECU 40.

The motion manager 200 requests, to the actuator system 30, motion of the vehicle 1 according to the kinematic plans set in at least one of the plurality of applications of the driver assistance system 100. A detailed configuration of the motion manager 200 will be described below.

The actuator system 30 is configured to realize the request for the motion of the vehicle 1 output from the motion manager 200. The actuator system 30 includes a plurality of actuators. FIG. 1 illustrates an example where the actuator system 30 includes, for example, a power train system 302 (the power train 302*a*, see FIG. 2), a brake 304, and a steering system 306 (a steering device) as actuators. The number of actuators that are requesting destinations of the motion manager 200 is not limited to three as described above, but may be four or more, or may be two or less. The power train 302*a* is one example of the "actuator" of the present disclosure.

The power train system 302 controls an operation of a vehicle body 1*a* included in the vehicle 1. The power train system 302 includes the power train 302*a* (see FIG. 2) capable of controlling (generating the driving force in a drive wheel) the driving of the vehicle 1 (the vehicle body 1*a*) and the power train ECU 302*b* (see FIG. 2) that controls the operation of the power train 302*a*. The power train 302*a* includes, for example, at least one of an internal combustion engine, such as a gasoline engine or a diesel engine, a transmission including a gearbox, a differential device, or the like, a motor generator as a driving source, a power accumulation device that accumulates power supplied to the motor generator, a power conversion device that mutually converts power between the motor generator and the power accumulation device, and a power generating source, such as a fuel cell. The power train ECU 302b that controls the operation of the power train 302a executes a control of a corresponding device so as to realize the request for the motion from the motion manager 200 to the corresponding device in the power train system 302. The power train ECU 302b is one example of an "actuator control unit" of the present disclosure.

The brake system 304a controls the operation of the vehicle body 1a. The brake system 304a is different (provided separately) from the power train system 302. Further, the brake 304 includes, for example, a plurality of brake devices provided on respective wheels of the vehicle 1. The brake devices include, for example, a hydraulic brake, such as a disc brake that generates a braking force using hydraulic pressure. As the brake device, for example, a motor generator that is connected to a wheel and that generates regenerative torque, may be further included. A braking operation of the vehicle 1 using the plurality of brake devices is controlled by the brake ECU 20. Separately from the motion manager 200, for example, a control unit (not shown) used for controlling the brake 304 is provided in the brake ECU 20.

The steering system 306 includes, for example, a steering device capable of changing a steering angle of a steering wheel (for example, a front wheel) of the vehicle 1 and an ECU (neither shown) that controls an operation of the steering device. The steering device includes, for example, the steering wheel that changes the steering angle according to an operation amount, and an electric power steering (EPS) in which the steering angle can be arbitrated by an actuator, separately from the operation of the steering wheel. The ECU that controls the operation of the steering device controls an operation of an actuator of the EPS.

The central ECU 40 includes a memory 42 capable of updating stored content. The central ECU 40 is configured to be communicable with, for example, the brake ECU 20, and configured to be communicable with a device (not shown, for example, a server) outside the vehicle 1 by way of a communication module (not shown).

Figure 2:
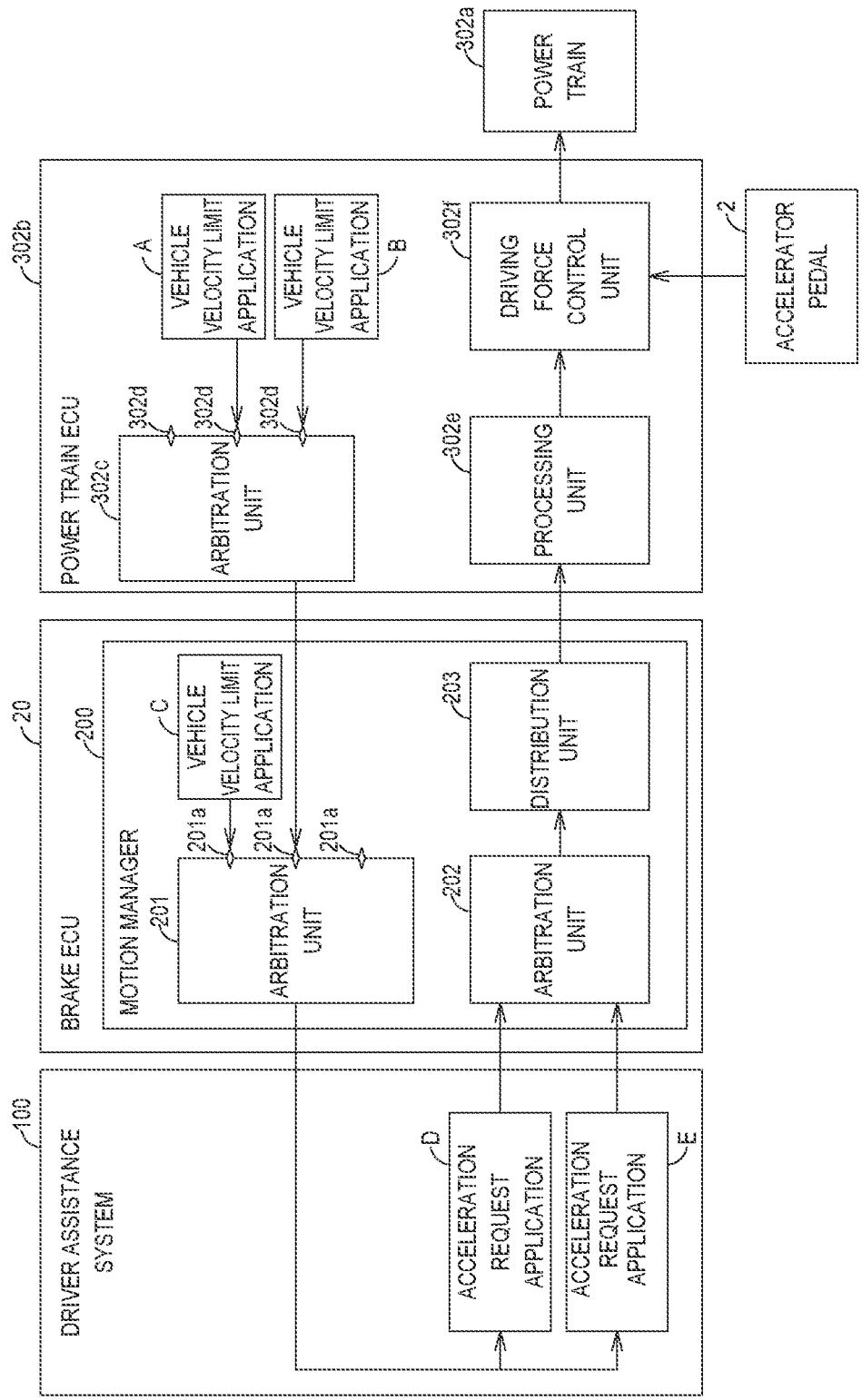
FIG. 2 is a diagram illustrating a detailed configuration of the vehicle according to the first embodiment.

FIG. 2 is a diagram illustrating detailed configurations of the motion manager 200, the driver assistance system 100, and the power train ECU 302b.

The power train ECU 302b includes a vehicle velocity limit application A (hereinafter, referred to as a vehicle velocity limit application A) and a vehicle velocity limit application B (hereinafter, referred to as a vehicle velocity limit application B) that set kinematic plans for the vehicle 1. A kinematic plan (an upper limit value of a vehicle velocity) of the vehicle 1 set by each of the vehicle velocity limit application A and the vehicle velocity limit application B is arbitrated by an arbitration unit 302c. In this case, the smaller one of an upper limit value of the vehicle velocity set by the vehicle velocity limit application A and an upper limit value of the vehicle velocity set by the vehicle velocity limit application B becomes an arbitration result by the arbitration unit 302c. The arbitration result by the arbitration unit 302c is input to an arbitration unit 201 (described below) of the motion manager 200. Each of the vehicle velocity limit application A and the vehicle velocity limit application B is an example of a "first application" of the present disclosure. Further, the arbitration unit 302c is an example of a "first arbitration unit" of the present disclosure, and processing of the arbitration unit 302c is an example of processing of a "first processor" of the present disclosure. Further, the kinematic plan for the vehicle 1 set by each of the vehicle velocity limit application A and the vehicle velocity limit application B is an example of a "first kinematic plan" of the present disclosure.

The vehicle velocity limit application A includes, for example, a fixed speed limiter. Specifically, the vehicle velocity limit application A is an application used for always limiting an upper limit value of the vehicle velocity such that it is not equal to or higher than a predetermined value (for example, 80 km/h). Further, the vehicle velocity limit application B includes, for example, a speed limiter by urea selective catalytic reduction for a large diesel vehicle. Specifically, the vehicle velocity limit application B is an application used for limiting the upper limit value of the vehicle velocity such that it is not equal to or higher than a predetermined value (for example, 100 km/h) when an amount of a catalyst (urea) of the vehicle 1 is equal to or less than a predetermined amount. In other words, when the amount of the catalyst (urea) of the vehicle 1 is equal to or less than the predetermined amount, the vehicle velocity limit application B sets the upper limit value (the kinematic plan) of the vehicle velocity to the predetermined value (100 km/h). As above, the upper limit value of the vehicle velocity by the vehicle velocity limit application A and the upper limit value of the vehicle velocity by the vehicle velocity limit application B are different values.

One of the vehicle velocity limit application A and the vehicle velocity limit application B may be a speed limiter by a range mode. The speed limiter by the range mode is an application used for setting the upper limit value of the vehicle velocity to a predetermined value (for example, 90 km/h) such that the vehicle can travel a long distance based on, for example, an operation of the range of the vehicle 1 by the user or a remaining battery amount of the vehicle 1. A kinematic plan (the upper limit value of the vehicle velocity) of the speed limiter by the range mode may be input to an unused input port 302d (described below) of the arbitration unit 302c. Further, a control of the vehicle velocity limit application A and the vehicle velocity limit application B is not limited to the above example.

Here, when the vehicle velocity limit application A (the vehicle velocity limit application B) and the arbitration unit 302c are included in different systems (ECUs), the request (the kinematic plan) by the vehicle velocity limit application A (the vehicle velocity limit application B) may be altered between the systems (the ECUs). Therefore, it is desirable to restrict the request (the kinematic plan) by the vehicle velocity limit application A (the vehicle velocity limit application B) from being altered.

Therefore, in the first embodiment, the power train system 302 includes the vehicle velocity limit application A, the vehicle velocity limit application B, and the arbitration unit 302c. In other words, the vehicle velocity limit application A, the vehicle velocity limit application B, and the arbitration unit 302c are included in a common system (the power train system 302).

Specifically, the power train ECU 302b includes the vehicle velocity limit application A, the vehicle velocity limit application B, and the arbitration unit 302c. In other words, the vehicle velocity limit application A, the vehicle velocity limit application B, and the arbitration unit 302c are included in a common ECU (the power train ECU 302b).

As such, the requests (the kinematic plans) by the vehicle velocity limit application A and the vehicle velocity limit application B are delivered to the arbitration unit 302c without communication by the controller area network (CAN) or the like. In other words, the arbitration unit 302c acquires the request (the kinematic plan) by each of the vehicle velocity limit application A and the vehicle velocity limit application B without using the communication.

Further, the arbitration unit 302c includes a plurality of (three in FIG. 2) input ports 302d used for acquiring kinematic plans from a plurality of applications including the vehicle velocity limit application A and the vehicle velocity limit application B. In FIG. 2, a request (a kinematic plan) from an application is not input to one of the three input ports 302d. Therefore, the arbitration unit 302c can arbitrate a request (a kinematic plan) from one more application.

Further, the power train ECU 302b includes a processing unit 302e and a driving force control unit 302f. The driving force control unit 302f controls a driving force for driving the power train 302a. Details of the processing unit 302e will be described below.

Further, the brake system 304a (the brake ECU 20, the motion manager 200) includes the arbitration unit 201, a vehicle velocity limit application C (hereinafter, referred to as a vehicle velocity limit application C), an arbitration unit 202, and a distribution unit 203. The arbitration unit 201 and the vehicle velocity limit application C are examples of a "second arbitration unit" and a "second application" of the present disclosure, respectively. Further, processing of the arbitration unit 201 is an example of processing of a "second processor" of the present disclosure.

The vehicle velocity limit application C sets a kinematic plan (the upper limit value of the vehicle velocity) for the vehicle 1. Specifically, the vehicle velocity limit application C is an application used for limiting the upper limit value of the vehicle velocity (for example, 30 km/h) when an abnormality occurs in the steering system 306 (see FIG. 1). In other words, when an abnormality occurs in the steering system 306, the vehicle velocity limit application C sets the upper limit value (the kinematic plan) of the vehicle velocity to a predetermined value (30 km/h). The vehicle velocity limit application C may be included in the steering system 306. Further, the kinematic plan set by the vehicle velocity limit application C is an example of a "second kinematic plan" of the present disclosure.

Here, in the first embodiment, the arbitration unit 201 arbitrates the arbitration result by the arbitration unit 302c of the power train system 302 and the kinematic plan (the upper limit value of the vehicle velocity) set by the vehicle velocity limit application C. Specifically, the smaller one of a vehicle velocity limit value by the arbitration unit 302c and a vehicle velocity limit value set by the vehicle velocity limit application C becomes an arbitration result in the arbitration unit 201.

Further, as above, the vehicle velocity limit application C and the arbitration unit 201 are included in a common ECU (the brake ECU 20). As such, the request (the kinematic plan) by the vehicle velocity limit application C is delivered to the arbitration unit 201 without the communication by CAN or the like. In other words, the arbitration unit 201 acquires the request (the kinematic plan) by the vehicle velocity limit application C without using the communication.

Further, the arbitration unit 201 includes a plurality of (three in FIG. 2) input ports 201a used for acquiring the request (the kinematic plan) of the vehicle velocity limit application C and the arbitration result of the arbitration unit 302c. In FIG. 2, a request (a kinematic plan) from an application is not input to one of the three input ports 201a. Therefore, the arbitration unit 201 can arbitrate a request (a kinematic plan) from one more applications.

Further, the driver assistance system 100 includes an acceleration request application D (hereinafter, referred to as an acceleration request application D) and an acceleration request application E (hereinafter, referred to as an acceleration request application E).

Each of the acceleration request application D and the acceleration request application E is an application used for setting a lower limit value of acceleration of the vehicle 1 as a request (a kinematic plan) under a predetermined condition. For example, when the vehicle 1 is expected to collide, the acceleration request application D sets the lower limit value of the acceleration to, for example, $-30$ m/s$^2$. Further, the acceleration request application E always sets the lower limit value of the acceleration to, for example, $+10$ m/s$^2$. In other words, the lower limit value of the acceleration in the acceleration request application D and the lower limit value of the acceleration in the acceleration request application E are different values. A control based on the acceleration request application D and the acceleration request application E is not limited to the above example.

Here, in the first embodiment, the driver assistance system 100 sets the kinematic plan based on the arbitration result by the arbitration unit 201. Specifically, each of the acceleration request application D and the acceleration request application E receives the vehicle velocity limit value from the arbitration unit 201 of the motion manager 200 as an input and sets the lower limit value of the acceleration in the kinematic plan. The kinematic plan (the lower limit value of the acceleration) set in each of the acceleration request application D and the acceleration request application E is received by a reception unit (not shown) of the motion manager 200.

The arbitration unit 202 of the brake ECU 20 (the motion manager 200) arbitrates the kinematic plan (the lower limit value of the acceleration) of each of the acceleration request application D and the acceleration request application E received by the reception unit. Specifically, the arbitration unit 202 sets, as the arbitration result, the smaller one of the lower limit value of the acceleration set in the acceleration request application D and the lower limit value of the acceleration set in the acceleration request application E.

Further, the calculation unit (not shown) of the motion manager 200 calculates motion requests based on the arbitration result in the arbitration unit 202 and the motion of the vehicle 1 that is decided based on the arbitration result. The motion request is a physical amount used for controlling at least one actuator of the actuator system 30, and includes a physical amount different from a physical amount of the request for the kinematic plans. For example, when the request (a first request) for the kinematic plans is a longitudinal acceleration, the calculation unit calculates a value obtained by converting the acceleration into the driving force or the driving torque to be the motion request (a second request).

The distribution unit 203 distributes the motion requests calculated by the calculation unit to at least one actuator of the actuator system 30. When, for example, the acceleration of the vehicle 1 is requested, the distribution unit 203 distributes the motion requests only to the power train system 302. Alternatively, when deceleration of the vehicle 1 is requested, the distribution unit 203 appropriately distributes the motion requests to the power train system 302 and the brake 304 in order to realize a target deceleration. In the first embodiment, the distribution unit 203 distributes the motion request to the processing unit 302e of the power train ECU 302b.

The processing unit 302e of the power train 302a determines whether the motion request (a lower limit value of the driving force) from the distribution unit 203 is normal. For example, the processing unit 302e determines whether the lower limit value of the driving force from the distribution unit 203 is higher (or lower) than a predetermined threshold value. Upon determining that the motion request (the lower limit value of the driving force) is abnormal, the processing unit 302e rejects or changes (reduces) the motion request.

Further, upon detecting a fact that communication with the motion manager 200 is interrupted, the processing unit 302e may reject or change the motion request when detecting the fact that communication is interrupted.

The driving force control unit 302f of the power train ECU 302b decides the driving force to be output to the power train 302a based on a value output from the processing unit 302e and an accelerator opening (an amount of depression of an accelerator pedal 2 by a user).

Vehicle Control Method

Figure 3:
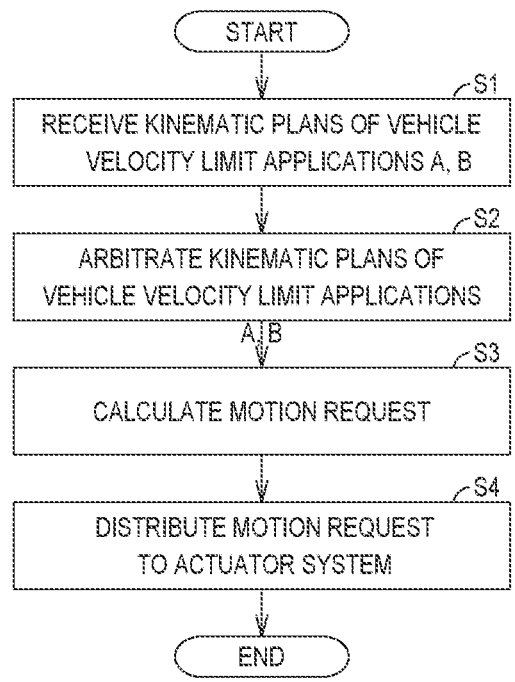
FIG. 3 is a flowchart illustrating a method of controlling the vehicle according to the first embodiment.

Next, a method of controlling the vehicle 1 using the actuator system 30 will be described with reference to FIG. 3.

First, in step S1, the kinematic plan (the upper limit value of the vehicle velocity) set by each of the vehicle velocity limit application A (see FIG. 2) and the vehicle velocity limit application B (see FIG. 2) that are included in the power train system 302 is received by the arbitration unit 302c (see FIG. 2) included in the power train system 302.

Next, in step S2, the kinematic plan (the upper limit value of the vehicle velocity) that is received in step S1 and is set by each of the vehicle velocity limit application A and the vehicle velocity limit application B is arbitrated by the arbitration unit 302c. Specifically, the arbitration unit 302c sets, as the arbitration result, the smaller one of the upper limit value of the vehicle velocity set by the vehicle velocity limit application A and the upper limit value of the vehicle velocity set by the vehicle velocity limit application B.

The control in steps S1 and S2 is executed by causing a processor (not shown) of the power train ECU 302b to read a predetermined program. The processor is an example of a "computer" in the present disclosure.

Next, in step S3, the motion manager 200 (the calculation unit not shown) calculates a motion request output to the distribution unit 203 (see FIG. 2) based on the arbitration result of the arbitration unit 302c. Specifically, the arbitration unit 202 (see FIG. 2) arbitrates the kinematic plan (the lower limit value of the acceleration) of each of the acceleration request application D and the acceleration request application E based on the arbitration result by the arbitration unit 302c, whereby the motion request is calculated.

Then, in step S4, the motion request calculated in step S3 is distributed to any actuator of the actuator system 30 by the distribution unit 203.

As above, in the vehicle 1 according to the first embodiment, the power train system 302 includes the vehicle velocity limit application A and the vehicle velocity limit application B that set the kinematic plan for the vehicle 1, and the arbitration unit 302c. As such, since the vehicle velocity limit application A, the vehicle velocity limit application B, and the arbitration unit 302c are included in the common system (the power train system 302), it is not required to use the communication between the vehicle velocity limit application A, the vehicle velocity limit application B, and arbitration unit 302c. As a result, it is possible to restrict the request (the kinematic plan) by the vehicle velocity limit application A and the vehicle velocity limit application B from being altered during the communication.

Further, the requests (the kinematic plans) of the vehicle velocity limit applications A and B do not directly receive an input to the brake ECU 20, which is different from the power train system 302, but the result of the arbitration of the kinematic plans of the vehicle velocity limit applications A and B by the arbitration unit 302c is input. As such, even when the number of requests (the kinematic plans) by the applications is increased, it is not required to increase the number of interfaces between the arbitration unit 302c and the brake ECU 20. In other words, the interface used for transmitting data from the power train system 302 to the brake ECU 20 can be integrated into the interface between the arbitration unit 302c and the brake ECU 20. As a result, even when the number of requests (the kinematic plans) by the application is increased, it is possible to restrict a configuration of the vehicle 1 from becoming complicated.

Further, the vehicle velocity limit application A, the vehicle velocity limit application B, and the arbitration unit 302c are included in the power train ECU 302b. As such, it is possible to enhance responsiveness between the vehicle velocity limit application A, the vehicle velocity limit application B, and the arbitration unit 302c.

Further, the brake system 304a includes the arbitration unit 201 that arbitrates the arbitration result by the arbitration unit 302c of the power train system 302 and the kinematic plan set by the vehicle velocity limit application C. As such, it is possible to distribute, to the power train 302a, a more appropriate motion request than when only one of the arbitration unit 302c and the arbitration unit 201 executes the arbitration.

Second Embodiment

Next, a second embodiment of the present disclosure will be described with reference to FIGS. 4 and 5. In the second embodiment, different from the first embodiment in which the applications (the vehicle velocity limit application A and the vehicle velocity limit application B) of the power train system 302 are arbitrated, requests (kinematic plans) from different systems are arbitrated. The same configurations as in the first embodiment are denoted by the same reference signs, and the same description will not be repeated.

Configuration of Vehicle

Figure 4:
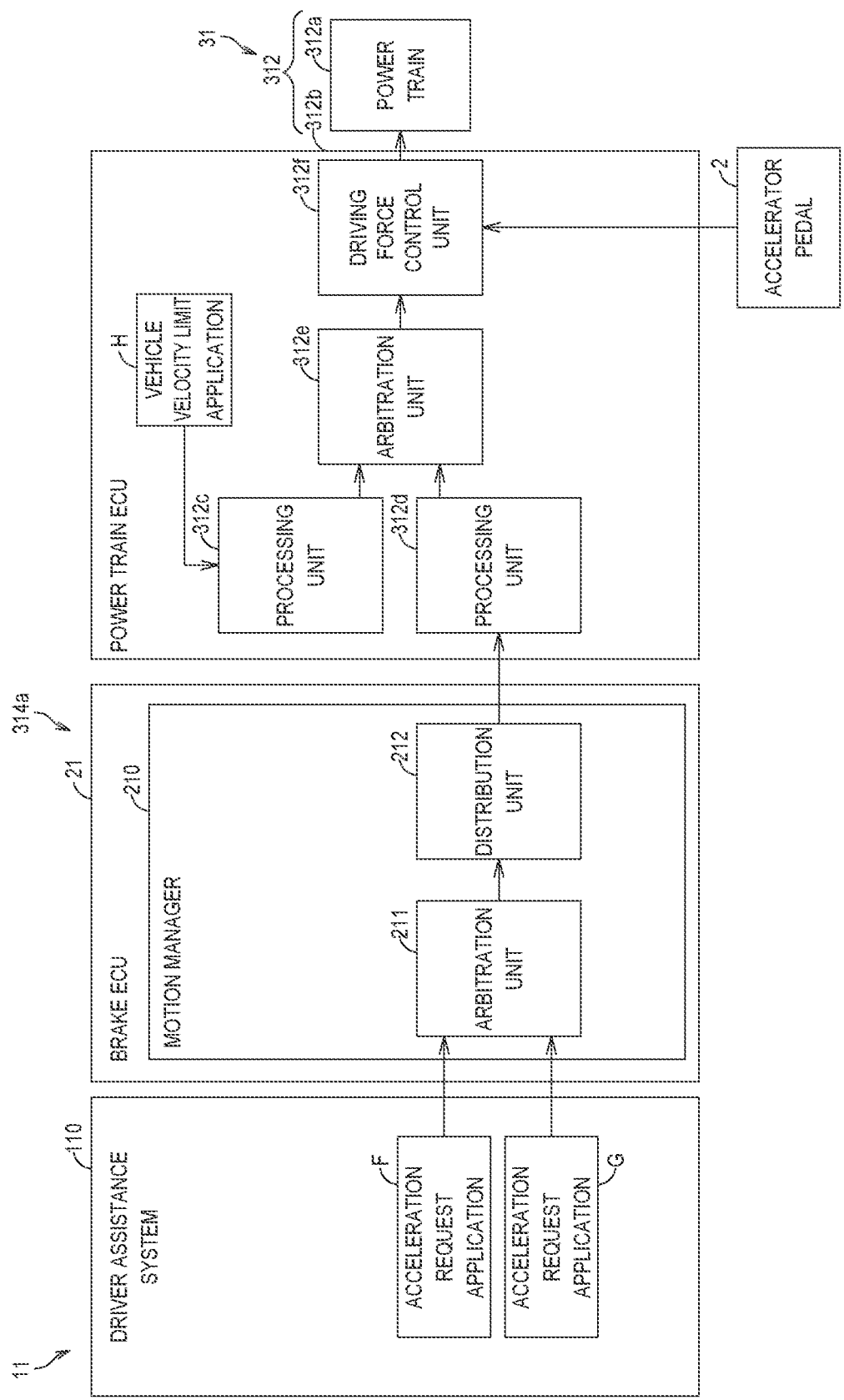
FIG. 4 is a diagram illustrating a configuration of a vehicle according to a second embodiment.
Figure 5:
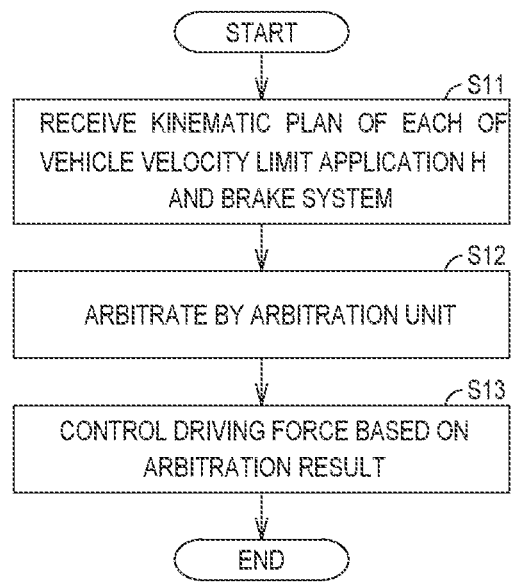
FIG. 5 is a flowchart illustrating a method of controlling the vehicle according to the second embodiment.

FIG. 4 is a diagram illustrating an example of a configuration of a vehicle 11. As illustrated in FIG. 4, the vehicle 11 includes a brake ECU 21, an actuator system 31, and a driver assistance system 110.

The vehicle 11 includes a brake system 314a that sets a kinematic plan for the vehicle 11 and is different from the power train system 312 described below. The brake system 314a includes the brake ECU 21. The brake system 314a is an example of a "third actuator system" of the present disclosure.

The brake ECU 21 includes a motion manager 210. The brake ECU 21 is configured to be communicable with various ECUs included in the actuator system 31.

The actuator system 31 includes the power train system 312. The power train system 312 includes a power train 312a and a power train ECU 312b. Each functional block (see FIG. 4) included in the brake ECU 21 and the power train ECU 312b is software that exhibits its function when a program is executed by a computer. Further, the power train system 312 is an example of the "first actuator system" and the "actuator system" of the present disclosure. Further, the power train 312a and the power train ECU 312b are examples of the "actuator" and an "actuator control unit", respectively.

The driver assistance system 110 includes an acceleration request application F (hereinafter, referred to as an acceleration request application F) and an acceleration request application G (hereinafter, referred to as an acceleration request application G).

Each of the acceleration request application F and the acceleration request application G is an application used for setting an upper limit value of acceleration of the vehicle 11 as a kinematic plan under a predetermined condition. For example, when the vehicle 11 is expected to collide, the acceleration request application F sets the upper limit value of the acceleration to, for example, $-30$ m/s$^2$. Further, the acceleration request application G always sets the upper limit value of the acceleration to, for example, 0 m/s$^2$. In other words, the upper limit value of the acceleration in the acceleration request application F and the upper limit value of the acceleration in the acceleration request application G are different values. A control based on the acceleration request application F and the acceleration request application G is not limited to the above example.

Further, the brake system 314a (the brake ECU 21, the motion manager 210) includes an arbitration unit 211 and a distribution unit 212.

The kinematic plan (the upper limit value of the acceleration) set in each of the acceleration request application F and the acceleration request application G is received by a reception unit (not shown) of the motion manager 210.

The arbitration unit 211 of the brake ECU 21 (the motion manager 210) arbitrates the kinematic plan (the upper limit value of the acceleration) of each of the acceleration request application F and the acceleration request application G received by the reception unit. Specifically, the arbitration unit 211 sets, as the arbitration result, the smaller one of the upper limit value of the acceleration set in the acceleration request application F and the upper limit value of the acceleration set in the acceleration request application G.

Further, a calculation unit (not shown) of the motion manager 210 calculates a motion request based on the arbitration result in the arbitration unit 211 and the motion of the vehicle 11 decided based on the arbitration result.

The distribution unit 212 distributes the motion request calculated by the calculation unit to at least one actuator of the actuator system 31. In the second embodiment, the distribution unit 212 distributes the motion request to a processing unit 312d (described below) of the power train ECU 312b.

The power train ECU 312b includes a vehicle velocity limit application H (hereinafter, referred to as a vehicle velocity limit application H), a processing unit 312c, the processing unit 312d, an arbitration unit 312e, and a driving force control unit 312f. The processing unit 312c and the processing unit 312d are examples of a "first processing unit" and a "second processing unit" of the present disclosure, respectively. Further, processing of the processing unit 312c and processing of the processing unit 312d are examples of the "first processing" and the "second processing" of the present disclosure, respectively, and are examples of processing of the "first processor". Further, the vehicle velocity limit application H is an example of the "first application" of the present disclosure. Further, the arbitration unit 312e is an example of the "first arbitration unit" of the present disclosure. Further, processing of the arbitration unit 312e is an example of processing of the "first processor" of the present disclosure.

The vehicle velocity limit application H includes, for example, a fixed speed limiter. Further, the vehicle velocity limit application H outputs a kinematic plan (an upper limit value of the driving force) on the driving force of the power train 312a to the processing unit 312c. Here, the vehicle velocity limit application H is an application for which it is highly necessary to prevent the set kinematic plan (the upper limit value of the vehicle velocity and the upper limit value of the driving force) from being altered. The kinematic plan (the upper limit value of the vehicle velocity and the upper limit value of the driving force) set by the vehicle velocity limit application H is an example of the "first kinematic plan" of the present disclosure.

The processing unit 312c and the processing unit 312d are separately provided from each other. Therefore, the processing unit 312c and the processing unit 312d execute processing based on different inputs.

The processing unit 312c determines whether the kinematic plan (the upper limit value of the driving force) set by the vehicle velocity limit application H is normal, and, upon determining that the kinematic plan is not normal, it rejects or changes the kinematic plan.

The processing unit 312d determines whether the kinematic plan (the upper limit value of the driving force) set by the brake system 314a (the brake ECU 21) is normal, and, upon determining that the kinematic plan is not normal, it rejects or changes the kinematic plan. Further, upon detecting the fact that communication with the motion manager 210 is interrupted, the processing unit 312d may reject or change the kinematic plan when detecting the fact that communication is interrupted.

By gradually increasing the upper limit value (the kinematic plan) of the driving force from 0 or the kinematic plan (the upper limit value of the driving force) on the driving force from the vehicle velocity limit application H to the driving force based on an accelerator operation by the user, the processing unit 312c (the processing unit 312d) may change the kinematic plan.

Here, in the second embodiment, the arbitration unit 312e arbitrates the kinematic plan set by the vehicle velocity limit application H of the power train system 312 and the kinematic plan set by the brake system 314a (the brake ECU 21, the motion manager 210). Specifically, the arbitration unit 312e arbitrates the output of the processing unit 312c, which receives the kinematic plan of the vehicle velocity limit application H as an input, and the output of the processing unit 312d, which receives the kinematic plan set by the brake system 314a as an input. The arbitration unit 312e outputs, to the driving force control unit 312f, the smaller one of the output of the processing unit 312c and the output of the processing unit 312d as the arbitration result. When one of the output of the processing unit 312c and the output of the processing unit 312d is rejected, the arbitration unit 312e sets the other one of the output of the processing unit 312c and the output of the processing unit 312d as the arbitration result.

Here, in the case (a comparative example) where the processing in the arbitration unit 312e is executed before the processing in the processing unit (the processing for determination and rejection), the arbitration result in the arbitration unit 312e may be rejected in the above processing unit. In this case, the request for the driving force control unit 312f goes away, and the control of the power train 312a cannot be normally executed. In contrast, in the second embodiment, even when the kinematic plan is rejected by one of the processing unit 312c and the processing unit 312d, the arbitration in the arbitration unit 312e is executed based on the output from the other one of the processing unit 312c and the processing unit 312d. As a result, it is possible to restrict the request for the driving force control unit 312f from going away.

The driving force control unit 312f of the power train ECU 312b decides the driving force output to the power train 312a based on the arbitration result of the arbitration unit 312e and the accelerator opening (the amount of depression of the accelerator pedal 2 by a user). As such, a restriction control of the accelerator is executed.

Vehicle Control Method

Next, a method of controlling the vehicle 11 using the actuator system 31 will be described with reference to FIG. 5.

First, in step S11, the kinematic plan (the upper limit value of the driving force) set by the brake system 314a (the brake ECU 21) and the kinematic plan (the upper limit value of the driving force) set by the vehicle velocity limit application H (see FIG. 4) of the power train system 312 are received by the arbitration unit 312e (see FIG. 4) of the power train system 312. Specifically, the output of the processing unit 312d that receives the kinematic plan set by the brake system 314a (the brake ECU 21) as an input and the output of the processing unit 312c that receives the kinematic plan set by the vehicle velocity limit application H as an input are received by the arbitration unit 312e.

Next, in step S12, the output of the processing unit 312c and the output of the processing unit 312d received in step S11 are arbitrated by the arbitration unit 312e.

Next, in step S13, the arbitration result in step S12 is input to the driving force control unit 312f. As such, the driving force for driving the power train 312a is decided by the driving force control unit 312f.

As such, in the vehicle 11 according to the second embodiment, the kinematic plans arbitrated by the arbitration unit 312e include the kinematic plan (the output of the distribution unit 212) set by the brake system 314a (the brake ECU 21), in addition to the kinematic plan (the upper limit value of the driving force) set by the vehicle velocity limit application H of the power train system 312. As such, it is possible to more appropriately control the driving force of the power train 312a based on the kinematic plan set by the brake system 314a than when driving the power train 312a based only on the kinematic plan set by the vehicle velocity limit application H.

Further, the arbitration unit 312e arbitrates the result processed by the processing unit 312c and the result processed by the processing unit 312d. As such, even when one of the kinematic plan (the upper limit value of the driving force) set by the vehicle velocity limit application H and the kinematic plan (the output of distribution unit 212) set by the brake system 314a (the brake ECU 21) is abnormal, it is possible to control the power train 312a based on the other one.

Other configurations and advantageous effects of the second embodiment are the same as those of the first embodiment.

Figure 6:
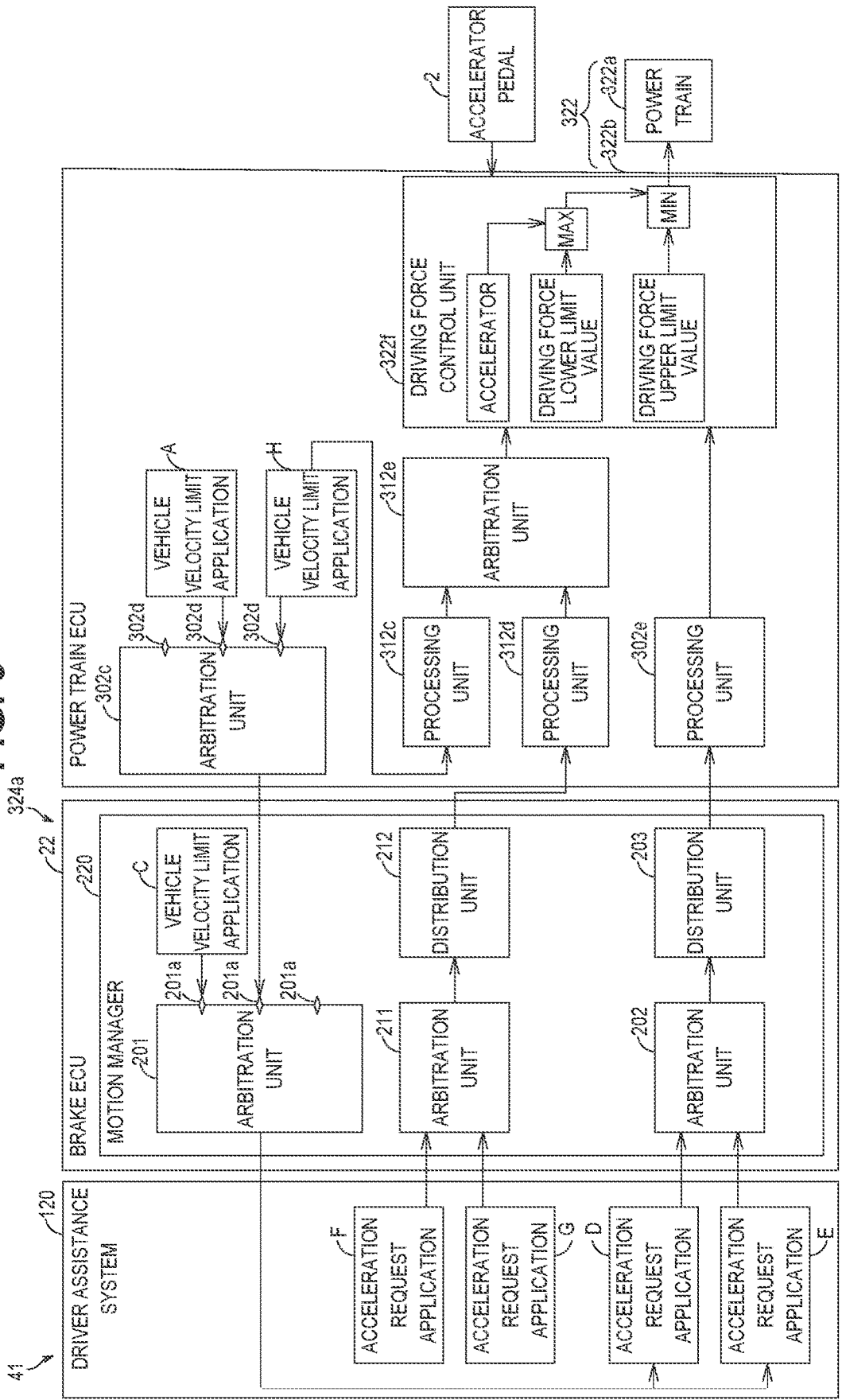
FIG. 6 is a diagram illustrating a configuration of a vehicle according to a modified example of the first and the second embodiments.

Further, as illustrated in FIG. 6, the configuration of the first embodiment and the configuration of the second embodiment may be integrated. A vehicle 41 illustrated in FIG. 6 includes a driver assistance system 120 including acceleration request applications D to G. Further, the vehicle 41 includes the brake system 324a (the brake ECU 22, the motion manager 220) including the arbitration unit 201, the arbitration unit 202, the arbitration unit 211, the distribution unit 203, the distribution unit 212, and the vehicle velocity limit application C. The brake system 324a is an example of the "second actuator system" and the "third actuator system" of the present disclosure.

Further, the vehicle 41 includes a power train ECU 322b including the arbitration unit 302c, the processing unit 302e, the processing unit 312c, the processing unit 312d, the arbitration unit 312e, the vehicle velocity limit application A, the vehicle velocity limit application H, and a driving force control unit 322f. The power train system 322 is composed of the power train ECU 322b and the power train 322a. The power train 322a and the power train ECU 322b are examples of the "actuator control unit" and the "actuator" of the present disclosure, respectively. Further, the power train system 322 is an example of the "first actuator system" and the "actuator system".

The driving force control unit 322f decides the driving force of the power train 322a based on the lower limit value of the driving force from the processing unit 302e, the upper limit value of the driving force from the arbitration unit 312e, and the input (the driving force) from the accelerator pedal 2. Specifically, the driving force control unit 322f decides the higher one (MAX) of the input value from the accelerator pedal 2 and the lower limit value of the driving force from the processing unit 302e, and the smaller one (MIN) of the input value from the accelerator pedal 2 and the upper limit value of the driving force from the arbitration unit 312e to be the driving force of the power train 322a. The same functional blocks as in the first embodiment or the second embodiment are denoted by the same reference signs as in the first embodiment or the second embodiment.

Further, in the example illustrated in FIG. 6, the arbitration unit 302c arbitrates the kinematic plan (the upper limit value of the vehicle velocity) set by the vehicle velocity limit application A and the kinematic plan (the upper limit value of the vehicle velocity) set by the vehicle velocity limit application H.

Further, in the first embodiment, an example in which the vehicle velocity limit application A (the first application) and the vehicle velocity limit application B (the first application) are included in the power train system 302b (the first actuator system) has been described, but the present disclosure is not limited thereto. Only one of the vehicle velocity limit application A and the vehicle velocity limit application B is included in power train system 302b, and the other one of the vehicle velocity limit application A and the vehicle velocity limit application B may be included in another system (for example, the steering system 306 and the brake system 304a).

Further, in the first embodiment, an example in which the vehicle velocity limit application A (the first application), the vehicle velocity limit application B (the first application), and the arbitration unit 302c (the first arbitration unit) are included in the power train system 302b (the first actuator system) has been described, but the present disclosure is not limited thereto. The vehicle velocity limit application A, the vehicle velocity limit application B, and the arbitration unit 302c may be included in the brake system 304a (the second actuator system) or the steering system 306. Further, in the second embodiment as well, the vehicle velocity limit application H (the first application) and the arbitration unit 312e (the first arbitration unit) may be included in the brake system 314a (the third actuator system) or the steering system 306.

Further, in the first embodiment, an example in which the vehicle velocity limit application A (B) (the first application) is included in the power train system 302b (the first actuator system) has been described, but the present disclosure is not limited thereto. An application that limits a parameter other than the vehicle velocity (for example, the acceleration and a steering angle) may be included in the power train system 302b. Further, the driver assistance system 110 may include an application that limits a parameter other than the acceleration (for example, the vehicle velocity and the steering angle). The same may be applied to the second embodiment.

Further, in the first embodiment, an example in which the vehicle velocity limit application A (the first application) and the vehicle velocity limit application B (the first application) are applications that set the upper limit value of the vehicle velocity has been described, but the present disclosure is not limited thereto. The vehicle velocity limit application A and the vehicle velocity limit application B may be applications that set the lower limit value of the vehicle velocity. Further, the vehicle velocity limit application H (the first application) in the second embodiment may be an application that sets the lower limit value of the vehicle velocity.

A configuration in which all or some of the modified example is appropriately combined may be implemented.

The embodiments disclosed in the present disclosure should be considered as illustrative in all points, and not be considered as limited. The scope of the present disclosure is defined by the claims, not by the above description, and is intended to include meanings equivalent to the claims and all modifications within the scope thereof.

What is claimed is:

1. An actuator system configured to control an operation of a vehicle, the actuator system comprising:
    a first actuator system configured to control an operation of a vehicle body and including at least one first application and a first processor, the first application being configured to set a first kinematic plan for the vehicle and the first processor configured to arbitrate a plurality of kinematic plans including the first kinematic plan;
    a third actuator system that is configured to control the operation of the vehicle body, set a third kinematic plan for the vehicle, and is different from the first actuator system; wherein:
    the first processor is configured to execute a second arbitration;
    the plurality of kinematic plans arbitrated in the second arbitration includes the third kinematic plan set by the third actuator system in addition to the first kinematic plan set by the first application of the first actuator system;
    the first kinematic plan includes a first predetermined upper limit value of a driving force and the third kinematic plan includes a second predetermined upper limit value of the driving force; and
    the first processor is configured to:
        determine whether the first kinematic plan set by the first application and acquired without communication by a vehicle network for control path is normal based on the first predetermined upper limit value, and execute, upon determining that the first kinematic plan is not normal, first processing for rejecting or changing the first kinematic plan;
        determine whether the third kinematic plan set by the third actuator system and acquired via the communication by the vehicle network for control path is normal based on the second predetermined upper limit value, and execute, upon determining that the third kinematic plan is not normal, second processing for rejecting or changing the third kinematic plan; and
        arbitrate, in the second arbitration, a result processed by the first processing and a result processed by the second processing.

2. The actuator system according to claim 1, further comprising:
    an actuator configured to control driving of the vehicle; and
    an electronic control unit configured to control an operation of the actuator,
    wherein the electronic control unit includes the at least one first application and the first processor.

3. The actuator system according to claim 1, further comprising:
    an actuator configured to control driving of the vehicle; and
    an electronic control unit configured to control an operation of the actuator,
    wherein the actuator includes a power train.

4. The actuator system according to claim 3, wherein the at least one first application includes an application used for limiting a velocity of the vehicle.

5. The actuator system according to claim 1, wherein the vehicle network for control path includes a controller area network (CAN).

6. A vehicle comprising:
    a vehicle body;
    a first actuator system configured to control an operation of the vehicle body and including at least one first application and a first processor, the first application being configured to set a first kinematic plan for the vehicle and the first processor being configured to arbitrate a plurality of kinematic plans including the first kinematic plan;
    a third actuator system that is configured to control the operation of the vehicle body, set a third kinematic plan for the vehicle, and is different from the first actuator system, wherein:
    the first processor is configured to execute a second arbitration;
    the plurality of kinematic plans arbitrated in the second arbitration includes the third kinematic plan set by the third actuator system in addition to the first kinematic plan set by the first application of the first actuator system;
    the first kinematic plan includes a first predetermined upper limit value of a driving force and the third kinematic plan includes a second predetermined upper limit value of the driving force; and
    the first processor is configured to:
        determine whether the first kinematic plan set by the first application and acquired without communication by a vehicle network for control path is normal based on the first predetermined upper limit value, and execute, upon determining that the first kinematic plan is not normal, first processing for rejecting or changing the first kinematic plan;
        determine whether the third kinematic plan set by the third actuator system and acquired via the communication by the vehicle network for control path is normal based on the second predetermined upper limit value, and execute, upon determining that the third kinematic plan is not normal, second processing for rejecting or changing the third kinematic plan; and
        arbitrate, in the second arbitration, a result processed by the first processing and a result processed by the second processing.

7. The vehicle according to claim 6, further comprising:
a second application configured to set a second kinematic plan for the vehicle; and
a second actuator system that is configured to control the operation of the vehicle body and is different from the first actuator system, wherein:
the first processor is configured to execute a first arbitration; and
the second actuator system includes a second processor configured to arbitrate an arbitration result by the first arbitration of the first actuator system and the second kinematic plan set by the second application.

8. The vehicle according to claim 7, further comprising a driver assistance system configured to set a driver assistance kinematic plan on driver assistance of the vehicle,
wherein the driver assistance system is configured to set the driver assistance kinematic plan based on an arbitration result by the second processor.

9. A vehicle control method using an actuator system configured to control an operation of a vehicle, the vehicle control method comprising:
setting, by a first application of a first actuator system configured to control an operation of a vehicle body, a first kinematic plan for the vehicle that includes a first predetermined upper limit value of a driving force;
setting, by a third actuator system that is configured to control the operation of the vehicle body and is different from the first actuator system, a third kinematic plan for the vehicle that includes a second predetermined upper limit value of the driving force;
determining, by one or more processors included in the first actuator system, whether the first kinematic plan set by the first application and acquired without communication by a vehicle network for control path is normal based on the first predetermined upper limit value, and executing, upon determining that the first kinematic plan is not normal, first processing for rejecting or changing the first kinematic plan;
determining, by the one or more processors, whether the third kinematic plan set by the third actuator system and acquired via the communication by the vehicle network for control path is normal based on the second predetermined upper limit value, and executing, upon determining that the third kinematic plan is not normal, second processing for rejecting or changing the third kinematic plan; and
arbitrating, by the one or more processors, a plurality of kinematic plans including a result processed by the first processing and a result processed by the second processing.

* * * * *